(12) United States Patent
Huang et al.

(10) Patent No.: US 11,669,835 B2
(45) Date of Patent: *Jun. 6, 2023

(54) SYSTEMS AND METHODS OF VERIFYING INSTALLATION OF BUILDING AUTOMATION DEVICES

(71) Applicant: Honeywell International Inc., Charlotte, NC (US)

(72) Inventors: Weilun Huang, Beijing (CN); Chunfu Li, Beijing (CN); Zhi Wang, Beinjing (CN); Xing Yin, Shanghai (CN); Chen Shi, Beijing (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,705

(22) Filed: Dec. 8, 2021

(65) Prior Publication Data

US 2022/0101313 A1    Mar. 31, 2022

Related U.S. Application Data

(63) Continuation of application No. 16/568,753, filed on Sep. 12, 2019, now Pat. No. 11,216,811.

(51) Int. Cl.
*G06Q 20/38* (2012.01)
*H04L 9/06* (2006.01)
(Continued)

(52) U.S. Cl.
CPC ....... *G06Q 20/389* (2013.01); *G06F 16/2365* (2019.01); *G06Q 10/06395* (2013.01);
(Continued)

(58) Field of Classification Search
None
See application file for complete search history.

(56) References Cited

U.S. PATENT DOCUMENTS 7,089,552 B2 *  8/2006  Atallah .................... G06F 8/71
                                                            717/175
9,849,364 B2 * 12/2017  Tran ....................... A63B 69/36
(Continued)

OTHER PUBLICATIONS

U.S. Appl. No. 15/970,418 , "Systems and Methods of Verifying Installation of Building Automation Devices", filed May 3, 2018.
(Continued)

*Primary Examiner* — Paul S Schwarzenberg
(74) *Attorney, Agent, or Firm* — Seager, Tufte & Wickhem, LLP (57) ABSTRACT

Methods and systems may be configured to verify proper installation of Internet Protocol (IP) connectable building automation devices by installers at remote sites. The installers may be a crowdsourced installers. A service provider may engage an installer to install one or more IP connectable building automation devices. To ensure verification that the one or more IP connectable building automation devices are installed properly, parameters or values based on data from installed IP connectable building automation devices may be provided to or determined by a blockchain network. The blockchain network may compare the parameters or values to thresholds and automatically provide an indication as to whether the parameters or values meet or exceed the thresholds (e.g., verification criteria).

20 Claims, 7 Drawing Sheets

(51) Int. Cl.
*H04L 12/28* (2006.01)
*G06F 16/23* (2019.01)
*G06Q 10/0639* (2023.01)
*H04L 9/00* (2022.01)

(52) U.S. Cl.
CPC .......... *H04L 9/0637* (2013.01); *H04L 12/283* (2013.01); *G06Q 2220/00* (2013.01); *H04L 9/50* (2022.05)

(56) References Cited

U.S. PATENT DOCUMENTS

| | | | |
|---|---|---|---|
| 10,425,414 B1 * | 9/2019 | Buckingham | G06F 21/35 |
| 10,855,448 B2 | 12/2020 | McMurdie et al. | |
| 2016/0234241 A1 | 8/2016 | Talamanchi et al. | |
| 2017/0011318 A1 | 1/2017 | Vigano et al. | |
| 2017/0284691 A1 * | 10/2017 | Sinha | F24F 11/62 |
| 2017/0358041 A1 * | 12/2017 | Forbes, Jr. | G06Q 10/00 |
| 2018/0198628 A1 | 7/2018 | Hojsik et al. | |
| 2018/0308087 A1 * | 10/2018 | Maimon | G06Q 20/3552 |
| 2019/0026716 A1 * | 1/2019 | Anbukkarasu | G06Q 20/389 |
| 2019/0122086 A1 * | 4/2019 | Basu | G06Q 50/02 |
| 2019/0128771 A1 | 5/2019 | Santarone et al. | |
| 2019/0163896 A1 * | 5/2019 | Balaraman | G06F 16/27 |
| 2020/0044859 A1 * | 2/2020 | Srivastava | H04L 9/0894 |
| 2020/0201988 A1 * | 6/2020 | Park | H04L 9/3239 |
| 2020/0213193 A1 * | 7/2020 | Newell | H04L 41/04 |

OTHER PUBLICATIONS

Rosic, "What is Ethereum?" A Step-by-Step Beginners Guide, blockgeeks.com, Dec. 2017, 19 pages.

"SSL Certificate Validation/ What is a Certification Authority," web.archive.org, Sep. 2017, 13 pages.

Hojsik et al., "Automated Certificate Enrollment for Devices in Industrial Control Systems or Other Systems," U.S. Appl. No. 15/891,095, filed Feb. 7, 2018, 42 pages.

"Smart Contract," Wikipedia, 4 pages, last edited Jul. 16, 2019.

* cited by examiner

SYSTEMS AND METHODS OF VERIFYING INSTALLATION OF BUILDING AUTOMATION DEVICES

This is a continuation of co-pending U.S. patent application Ser. No. 16/568,753, filed Sep. 12, 2019, which is incorporated herein by reference.

TECHNICAL FIELD

This disclosure relates generally to installation of building automation devices. More specifically, this disclosure relates to systems and methods for verifying proper installation of building automation devices connectable to one or more computing networks.

BACKGROUND

Building automation systems (BAS) are routinely used to monitor, control, and/or automate building controls, which may include security systems, surveillance systems, environment control systems, etc. In some cases, building automation devices of a BAS may be installed and/or set up on-site by one or more installers. When entire buildings are fitted with building automation devices, a plurality of installers may be used to install and configure the building with building automation devices. Once installed, the building automation devices may be configured to operate on one or more computer networks, such as a local area network (LAN) and/or a wide ware network (WAN), depending on the application.

SUMMARY

This disclosure is directed towards installation of building automation devices, and more particularly to systems and methods for verifying proper installation of building automation devices connected to one or more computer networks. Improvements in verification of proper installation of building automation devices is desired, particularly when crowdsourcing the installers.

In one example, a method of and system for verifying proper installation of an IP connectable building automation device by a crowdsource installer at a remote site is provided. The method may include receiving an installer registration at a service provider from the crowdsourced installer over the Internet. The installer registration may identify the crowdsourced installer and an Internet Protocol (IP) connectable building automation device that is to be installed and connected to the service provider over the Internet by the crowdsourced installer. The service provider may establish a blockchain distributed ledger on the Internet for the installation of the identified IP connectable building automation device. The blockchain distributed ledger may identify the service provider, the identified IP connectable building automation device, and the crowdsourced installer. The service provider may receive data from the identified IP connectable building automation device over the Internet after the identified IP connectable building automation device has been installed and connected to the service provider over the Internet by the crowdsourced installer. The service provider may determine one or more parameters based on the received data that may relate to whether the identified IP connectable building automation device has been properly installed and connected to the service provider over the Internet by the crowdsourced installer. The service provider may provide the one or more of the parameters to the blockchain distributed ledger. The blockchain distributed ledger may be configured to analyze the one or more parameters to determine whether the identified IP connectable building automation device has been properly installed and connected to the service provider over the Internet by the crowdsourced installer. Further, the blockchain distributed ledger may be configured to initiate a payment to the crowdsourced installer when the blockchain distributed ledger has determined that the identified IP connectable building automation device has been properly installed and connected to the service provider over the internet by the crowdsourced installer.

In another example, a method and system for verifying installation of an IP connectable building automation device at a remote site is provided. The method may include receiving an installer registration request identifying an installer and an IP connectable building automation device that is to be installed by the installer. Further, one or more verification criteria may be established, that when satisfied, verify proper installation of the IP connectable building automation device by the installer. A blockchain distributed ledger may be established for the installation of the identified IP connectable building automation device by the installer. The blockchain distributed ledger may identify the IP connectable building automation device, the installer, and the one or more verification criteria. Further, the blockchain distributed ledger may be configured to identify whether the one or more verification criteria have been satisfied, and when so, provide an indication to the installer that the IP connectable building automation device has been properly installed by the installer.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

Building automation systems may include one or more building automation devices installed in one or more buildings. In some cases, the building automation devices may be installed at an installation site of a building by one or more installers. In some cases, the one or more installers may be crowdsourced. Alternatively, or in addition, one or more owners of a building may self-install the building automation devices.

Building automation devices may include any suitable building automation devices configured to facilitate automation of one or more building-related functions. Building automation devices may include, but are not limited to, a light controller, a thermostat, surveillance system components, heating, ventilation, and air conditioning (HVAC) components, security system components, fire protection components, etc.

The building automation devices may be configured to operate entirely off-line. Alternatively, the building automation devices may be configured to operate and/or communicate with other computing devices over one or more local area and/or wide area computer networks. In some cases, one or more of the building automation devices may be Internet Protocol (IP) connectable building automation devices configured to communicate over an IP network, such as the Internet. In some cases, one or more of the building automation devices may not itself be an IP connectable building automation device, but may be configured to communicate with an IP connectable building automation device via a wired or wireless interface.

Figure 1:
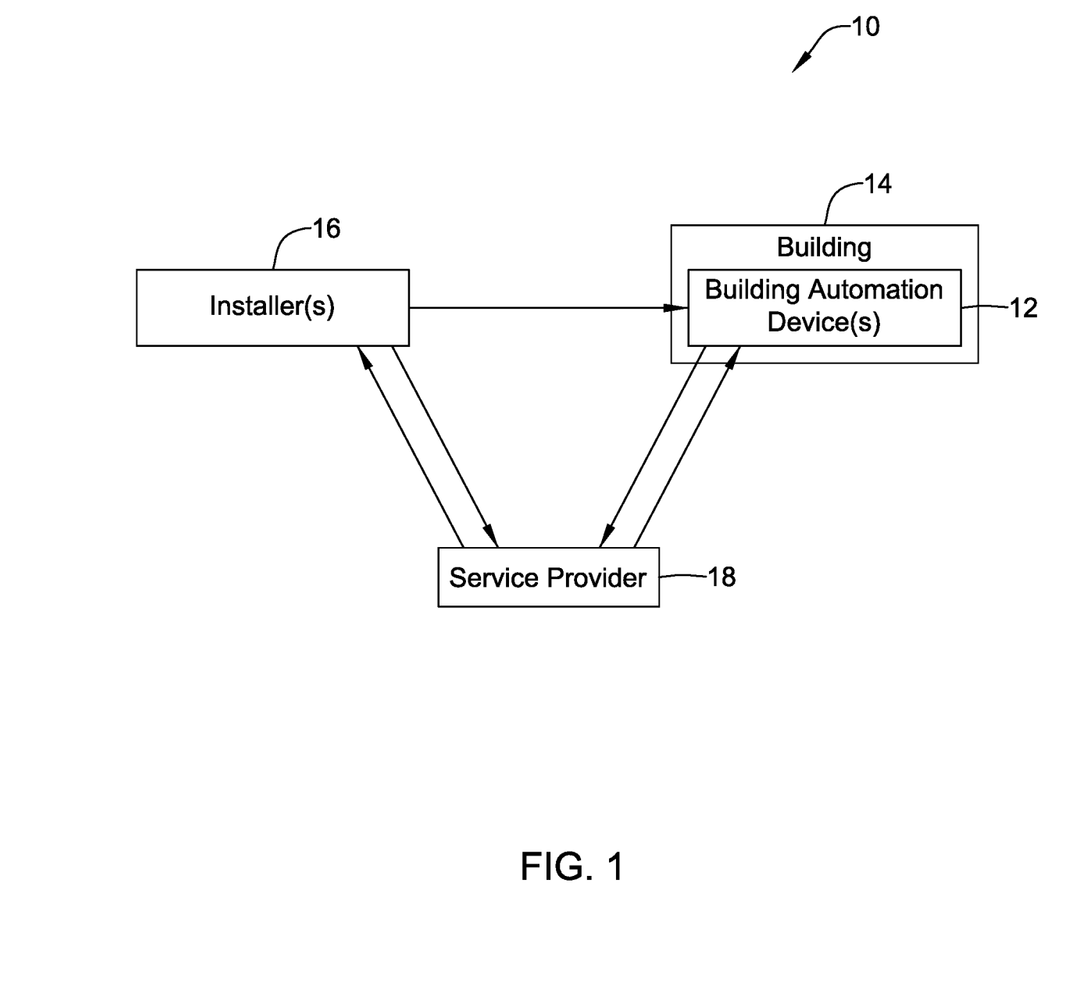
FIG. 1 is a schematic diagram of an illustrative system for installation of building automation devices.

FIG. 1 schematically depicts an illustrative system 10 useful for verifying installation of building automation devices 12. The illustrative system 10 may include one or more building automation devices 12 for installation in a building 14 by an installer 16. Once installed, the building automation device(s) 12 may be connected to a local area network (LAN) and/or a wide area network (WAN) (e.g., the Internet) and may be connected to and may communicate with a service provider 18 across the WAN. In some cases, the building automation devices 12 may be configured to communicate with a server and/or other computing device of the service provider 18 to pass data from building automation devices 12 to the service provider 18, provide software updates from the service provider 18 to the building automation devices 12, provide control instructions/signals from the service provider 18 (e.g., via or from a user account with the service provider 18 that is associated with the building automation device 12), and/or communicate other suitable data, instructions, and/or information.

In some cases, the installers 16 may be approved or certified by the service provider 18 to install building automation devices 12 from or associated with the service provider 18. However, installers 16 that have not been approved by the service provider 18 (e.g. crowdsourced installers) may additionally or alternatively install the building automation devices 12 at one or more buildings. When the installer 16 is a service provider approved installer, the installer 16 may have an account with the service provider 18 through which the installer 16 may receive installation jobs, update installation jobs, organize installation jobs, and/or have one or more other interactions with the service provider 18.

The building automation devices 12 may be any suitable type of device configured to facilitate automation of one or more building functions. In some cases, the building automation devices 12 may include a computing device having a processor, memory, an input/output (I/O) unit (e.g., which may include a communications unit), and/or other suitable components (e.g., as discussed in greater detail below with respect to FIG. 2). Further, the building automation devices 12 may communicate with one or more computing devices of the installer 16 and/or the service provider 18 over one or more computer networks.

In some cases, the computing devices of the installer 16 and/or service provider 18 may be or may include one or more of a thick client (e.g., a computing device and associated hardware) and/or a thin client (e.g. web browser). Example thick clients include, but are not limited to, a personal computer, a mobile phone, a tablet computer, a laptop computer, a server, etc. Example thin clients may include, but are not limited to, a web client (e.g., a web-based client having a website interface to communicate with the building automation devices 12 and/or the service provider 18), a mobile application (app) (e.g., a mobile app having an interface to communicate with the building automation device 12 and/or the service provider 18), etc. In one example of a thin client, the thin client may facilitate a user (e.g., the installer 16, a user/owner of the building automation device 12, etc.) accessing his/her user account associated with the service provider 18 and/or the building automation device 12 through interactions with a user interface of a computing device.

Figure 2:
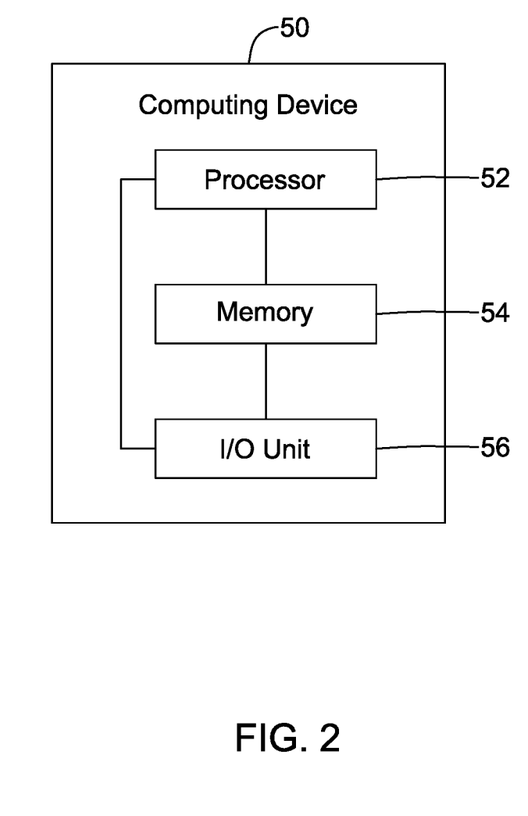
FIG. 2 is a schematic diagram of an illustrative computing device.

FIG. 2 depicts a schematic block diagram of an illustrative computing device 50, the components of which may be incorporated in and/or utilized by one or more of the building automation devices 12, buildings 14, installers 16, service providers 18, and/or other computing device components discussed herein. In one example, the building automation devices 12 may be or may include one or more computing devices 50. The installer 16 and the service provider 18 may include or otherwise utilize one or more computing devices 50 to communicate with one another, store data related to one another, communicate with the building automation devices 12, and/or store data related to the building automation devices 12. Other examples uses of computing devices 50 are contemplated. The illustrative computing device 50 may include, among other suitable components, a processor 52, memory 54, and an I/O unit 56.

The processor 52 of the computing device 50 may include a single processor or more than one processor working individually or with one another. The processor 52 may be configured to execute instructions, including instructions that may be loaded into the memory 54 and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory 54 of the computing device 50 may include a single memory component or more than one memory component each working individually or with one another. Example types of memory 54 may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory 54 may be or may include a non-transitory computer readable medium.

The I/O units 56 of the computing device 50 may include a single I/O component or more than one I/O component each working individually or with one another. Example I/O units 56 may be any type of communication port configured to communicate with other components of the building management system 10. Example types of I/O units 56 may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports, and/or other suitable ports.

In some cases, it may be desirable for service providers to crowdsource installers to install building automation devices in one or more buildings. For example, the service provider may post one or more building automation device installation jobs to an installer accessible job board and one or more installers may be able to indicate which install job(s) or part(s) of install jobs it is willing to perform. The term "crowdsource" may imply that many installers may have the opportunity to perform one or more jobs or parts of jobs, where the many installers may be a predetermined set of installers (e.g., a set of installers registered with the service provider and/or other predetermined set of installers) or public installers at-large (e.g., installers without a previous affiliation with the service provider). An installation job may be installation of a single building automation device and/or a batch of building automation devices at one or more locations. The service provider may accept installers for installation of the building automation devices until all of the installation jobs are taken. In some cases, the installers may actively bid on the installation jobs to ensure the service provider (and its customers) receive the best price for installation. Such crowdsourcing of installers for the installation of the building automation devices may assist the service provider with installation of building automation devices in a timely manner by allowing the service provider to find installers willing to install building automation devices in small jobs and/or large jobs. As a result, the crowdsourcing of installers may assist the service provider in expanding and/or fostering relationships with customers and/or partners due to the reduced building automation device installation costs and the ability to have building automation devices installed for small and large jobs, alike, in a timely manner.

Figure 3:
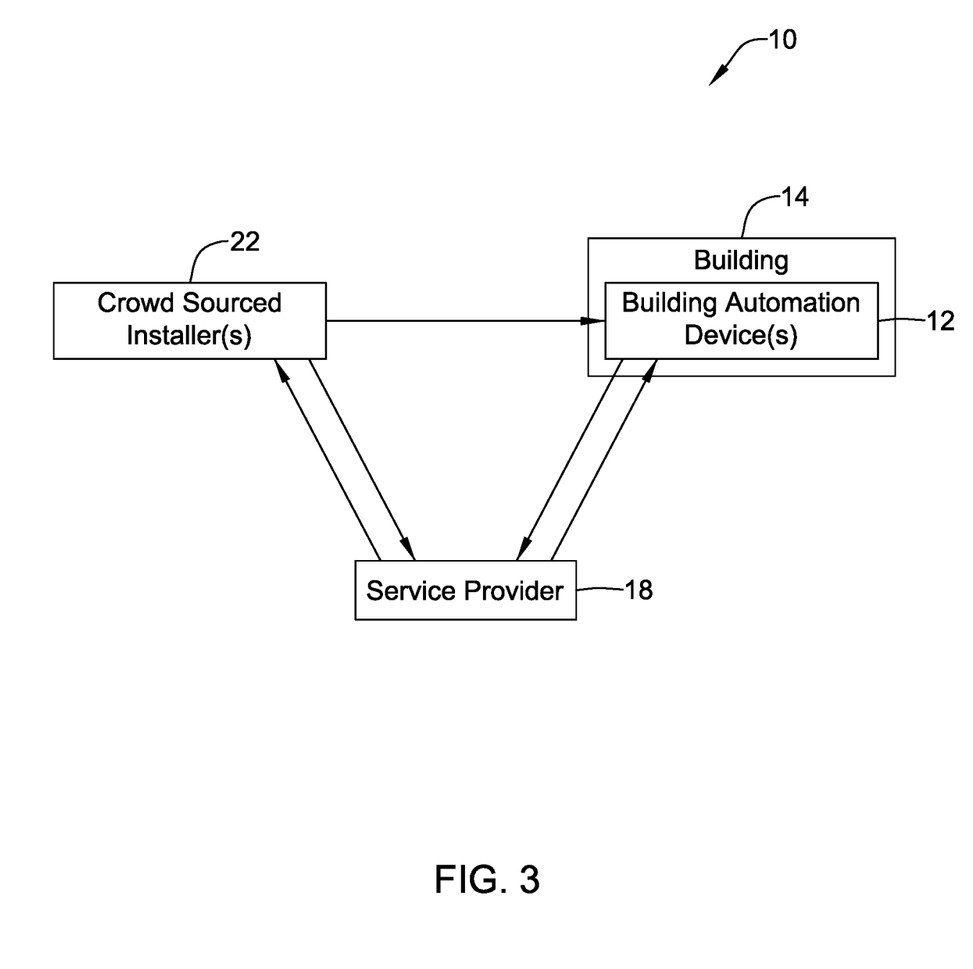
FIG. 3 is a schematic diagram of an illustrative system for installation of building automation devices.

FIG. 3 schematically depicts an illustrative system 10 for installing building automation devices 12 in one or more buildings 14 (e.g., at a site of or at a site remote from the service provider 18) by an installer (e.g., the installer 16 depicted in FIG. 1 or other suitable installer), where the installer may be a crowdsourced installer 22. The system 10 may be similar to the system 10 discussed above with respect to FIG. 1. Although the system 10 is depicted in FIG. 3 and described below as including a crowdsourced installer 22, the installer of the system 10 may be an installer that has not been crowdsourced and is otherwise selected for installing one or more IP connectable building automation devices 12.

The crowdsources installer 22 may be selected for an installation job installing IP connectable building automation devices 12 in any suitable manner. In one example, the service provider 18 may post jobs to a job site that is accessible by installers 22 and the installers 22 may bid on jobs or otherwise select jobs in which the installer 22 is interested in. Then, through an algorithm (e.g. first-in-first-out, number of prior successful installations by the installer, customer rating of the installer, size of the installer, location of the installer, etc.) or through active selection, the service provider 18 may select one or more installers 22 to work on a posted job. The algorithm and/or the service provider 18 may select installers 22 based on one or more factors including, but not limited to, a rating of the installer, a function of time between posting of job by the service provider 18 and a selection of the job by the installer 22, a size of the installer (e.g., individual, small-sized company, medium-sized company, large-sized company), location of the installer, etc.

Although crowdsourcing installers for the installation of building automation devices may facilitate a service provider expanding its customer and/or partner base, crowdsourcing installers may create operational and/or installation verification issues. For example, when service providers utilize crowdsourced installers to install building automation devices, the installed building automation devices may be installed such that devices have inconsistent and/or inadequate connectivity over one or more networks and/or have operational errors. Some of these issues may occur due to a lack of training of the installer by the service provider, a lack of familiarity between the installer and the device(s) being installed, the lack of ability of the installer, sloppiness of the installer, etc. Such connectivity and/or operational issues may lead to the service provider having to spend time and resources to repair the building automation devices and/or rework the installation of the devices. This may lead to dissatisfied customers and/or partners of the service provider. Further, it may be difficult and undesirable for the service provider to recoup its time, expenses, and lost goodwill incurred to correct improper or inadequate installation of the devices.

It is contemplated that blockchain technology may be used to address these operational and/or installation verification issues by verifying proper installation of IP connectable building automation devices by an installer, such as the crowdsourced installer 22 and/or other suitable installers, before the installer is paid for the installation work. In some cases, blockchain technology may be utilized to track the installer of each IP connectable building automation devices installed in specific building, track connectivity quality of each installed IP connectable building automation devices over time, track operational ability of the install IP connectable building automation device over time, track timing of installation of the installed IP connectable building automation devices, etc. Further, blockchain technology may be utilized to securely track and verify proper installation of the IP connectable building automation devices in a manner that ensures neither the installer nor the service provider is modifying verification data for its own gain. In some cases, blockchain technology may be used to automatically apply payments and/or penalties to the installer (e.g., directly or via a blockchain network) depending on how the installer's performance met certain predetermined criteria.

A blockchain generally refers to a distributed ledger of transactions, where various parties may have access to the distributed ledger. The parties may use the distributed ledger to perform various functions, such as publishing new transactions to the blockchain or using the blockchain to obtain or verify information. New transactions may be added as blocks to a blockchain often using cryptographic operations, and each block in the blockchain (except the first block) may be linked to a previous block in the blockchain. Approval by a threshold number of parties of a blockchain network may be needed to add transactions to the blockchain and/or to verify certain information.

Generally speaking, a blockchain network may be or may include a plurality of computing devices linked to each other, without a central computing device, where interactions with and/or of a system (e.g., a building management system, currency system, or other suitable system) may be recorded via transaction tokens or blocks in a distributed ledger (e.g., the blockchain) and distributed to each or set ones of the plurality of computing devices forming the blockchain network. The blockchain network may be publicly accessible so that any public entity may configure their system to secure its data using the public blockchain network. Alternatively or additionally, the blockchain network may be a private blockchain network that may be proprietary to a single entity or group of entities for securing data associated with one or more systems of the single entity or groups of entities. In public and/or private blockchain networks, the blocks are typically encrypted. In both cases, the transactions and/or other data recorded in the blockchain are replicated across many blockchain host nodes so that it is very difficult or impossible for a party to tamper with the distributed ledger without detection.

Figure 4:
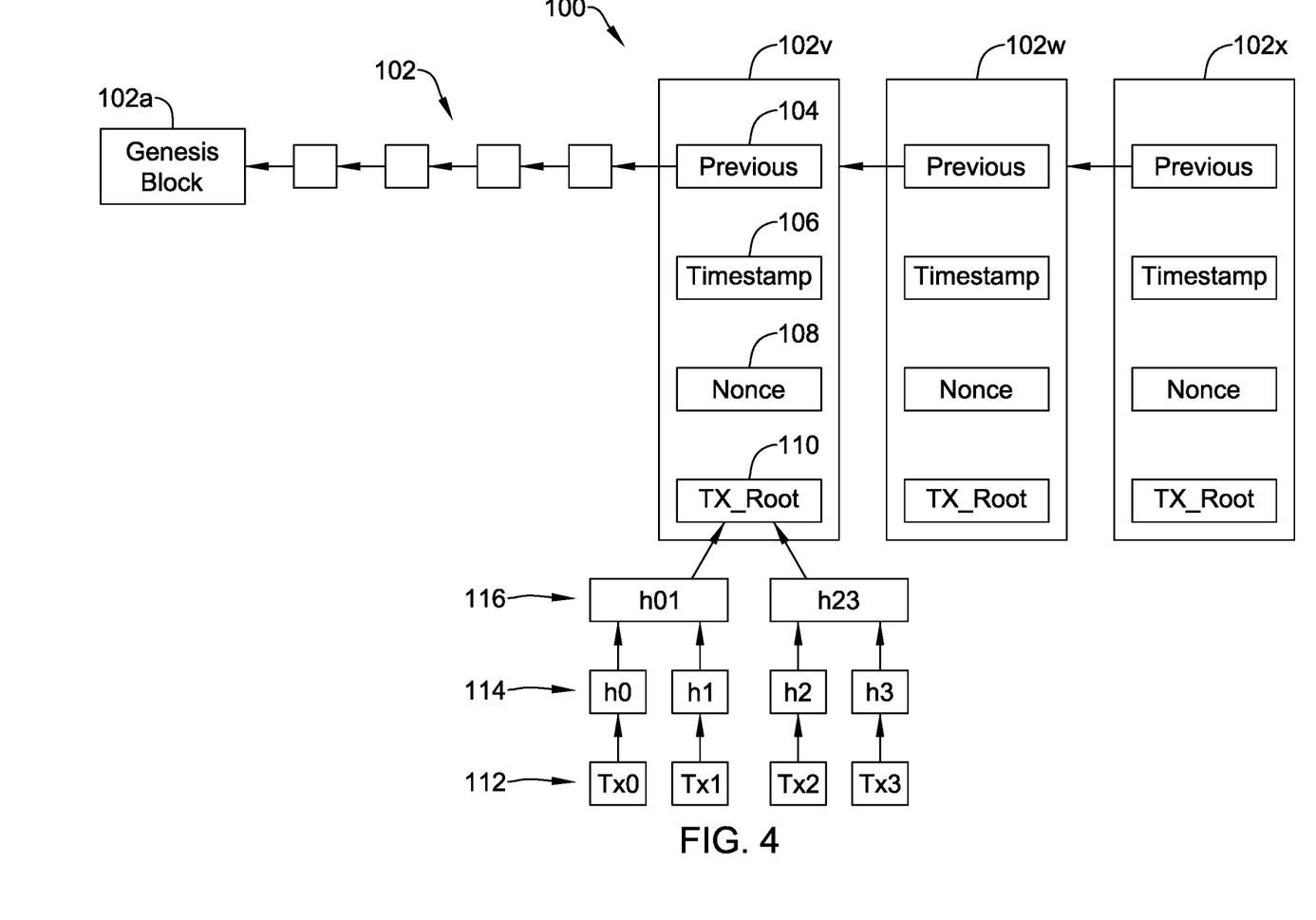
FIG. 4 is a schematic diagram of an illustrative blockchain distributed ledger.

FIG. 4 illustrates an example blockchain 100 (e.g., an example distributed ledger) used to secure data and help ensure the integrity of the data of building management systems or other systems according to this disclosure. As shown in FIG. 4, the blockchain 100 may include a sequence of blocks from 102a to 102v, 102w, and 102x (which are referred to generally as blocks 102). Each block 102 may function as a record associated with a specific transaction and, in some cases, each block 102 may be considered a transaction token. One or more of the blocks 102 may include or may be associated with one or more smart contracts that define allowable communications between nodes of the blockchain network and/or interactions with the blockchain network. Except for the first block 102a in the blockchain 100, each block 102 may include a previous hash value 104, which may represent a cryptographic hash from the previous block 102 in the blockchain 100. Each block 102 of the blockchain may include a timestamp 106, which identifies the date and time that the associated block 102 was created and a cryptographic signature (e.g., the cryptographic hash and/or other suitable cryptographic signature).

Each block 102 may further include a nonce value 108, which may represent a value that is added to the block 102 by a device or entity (e.g., the building automation device 12, the service provider 18, etc.) that created the block 102. The nonce value 108 may provide proof to other devices that the device that created the block 102 performed certain cryptographic operations in order to generate a valid block 102, where the other devices can easily verify the validity of the block 102 using the nonce value 108.

Each block 102 may include transaction data, which may include a transaction root hash value 110, but the transaction root hash value is not necessarily required. The transaction root hash value 110 in each block 102 may represent a hash value generated by the device that created that block 102 based on transaction information. In one example, the transaction root hash value 110 in each block 102 may be generated by taking data 112 associated with one or more transactions (e.g., smart contract data, user data, user location data, device location data, and/or other suitable data) and applying one or more hashing functions using the data 112. This may generate one or more hash values 114. Assuming there are multiple hash values 114, one or more additional hashing functions (such as pairwise hashing functions) may be applied to the hash values 114 in order to generate one or more additional hash values 116. An additional hashing function may then be applied to the hash values 116 and other contents of the block 102 in order to generate the root hash value 110. Note that this represents one example of how the transaction root hash value 110 may be generated and other examples are contemplated. In general, the root hash value 110 may be generated in any suitable manner, and often the root hash value 110 represents a cryptographic hash of most or all of the block 102. In some cases, the root hash value may be considered a cryptographic signature include with the block 102.

In one aspect of operation, multiple copies of the blockchain 100 may be stored and maintained by multiple host nodes (e.g., where a host node may be a node of a blockchain network containing the distributed ledger (e.g., the blockchain)). In some cases, all nodes of the blockchain network may be host nodes, but this is not required and instead, some number of nodes less than all of the nodes in the blockchain network may be host nodes. The blockchain 100 therefore may function as a distributed ledger that can be used by multiple devices to obtain or verify information contained in the blocks 102 of the blockchain 100.

Devices (e.g., nodes) may "mine" the blockchain 100 to identify blocks 102 containing desired information, such as one or more blocks 102 containing a smart contract involving two or more specific nodes or entities involved with the blockchain network. Devices may also generate new transaction data (such as new smart contracts), and cryptographic operations may be performed using the transaction data to create and add new blocks 102 to the blockchain 100. Thus, new blocks 102 may be appended to the blockchain 100 at different host nodes as new transactions occur, and these blocks 102 may be propagated to other host nodes so that the blockchain 100 can be updated at those nodes. Each new block 102 may be linked to a previous block 102 in the blockchain 100 as described above, which may help prevent someone from illicitly changing data in earlier blocks 102 of the blockchain 100. Approval of a threshold amount of the nodes of the blockchain network may be required before each new block 102 is added to the blockchain 100, before mined information is deemed valid, before a user is authorized, and/or before, a user request is granted.

A threshold amount of nodes may be all nodes or some number fewer than all nodes. For example, the threshold amount of nodes may be one hundred percent (100%) of nodes, ninety-five percent (95%) of nodes, ninety percent (90%) of nodes, eight percent (80%) of nodes, seventy percent (70%) of nodes, sixty percent (60%), fifty percent (50%) of nodes, twenty-five percent (25%) of nodes, and/or other suitable percentage of nodes or number of nodes.

In the context of establishing trust between nodes for communications (e.g., approval of a user to enter the blockchain network and/or approval of a request by a user), a blockchain 100 can be used to identify approved smart contracts involving various nodes of the blockchain network. When a node of the blockchain network attempts to initiate a communication session with another node of the blockchain network, the blockchain 100 may be used to determine whether a smart contract has already been approved for the initiating node. If so, at least one block 102 of the blockchain 100 may be identified as containing an appropriate smart contract, and the communication session may be allowed to proceed. If not, the node receiving the initiating request may generate a smart contract and request approval from one or more other nodes on the blockchain network, and one or more new blocks 102 may be added to the blockchain 100 (whether approved or rejected) that reflects the generated smart contract. Further, the blockchain 100 may be used by applications or other nodes in determining whether the initiating node is trusted, as well.

In this way, the blockchain 100 may provide a tamper-evident distributed ledger that can be used by multiple nodes. This may help establish trust between the various nodes in the blockchain network without relying on third-party digital certificates or self-signed digital certificates. The use of blockchain technology also helps to provide data security and data authenticity. In addition, the use of blockchain technology allows for distributed availability of the data.

Additional features of blockchain technology and additional features of blockchain technology as applied to industrial control systems are found in U.S. patent application Ser. No. 15/970,418, filed on May 3, 2018, and titled APPARATUS AND METHOD FOR USING BLOCKCHAINS TO ESTABLISH TRUST BETWEEN NODES IN INDUSTRIAL CONTROL SYSTEMS OR OTHER SYSTEMS, which is hereby incorporated by reference in its entirety and for all purposes.

Figure 5:
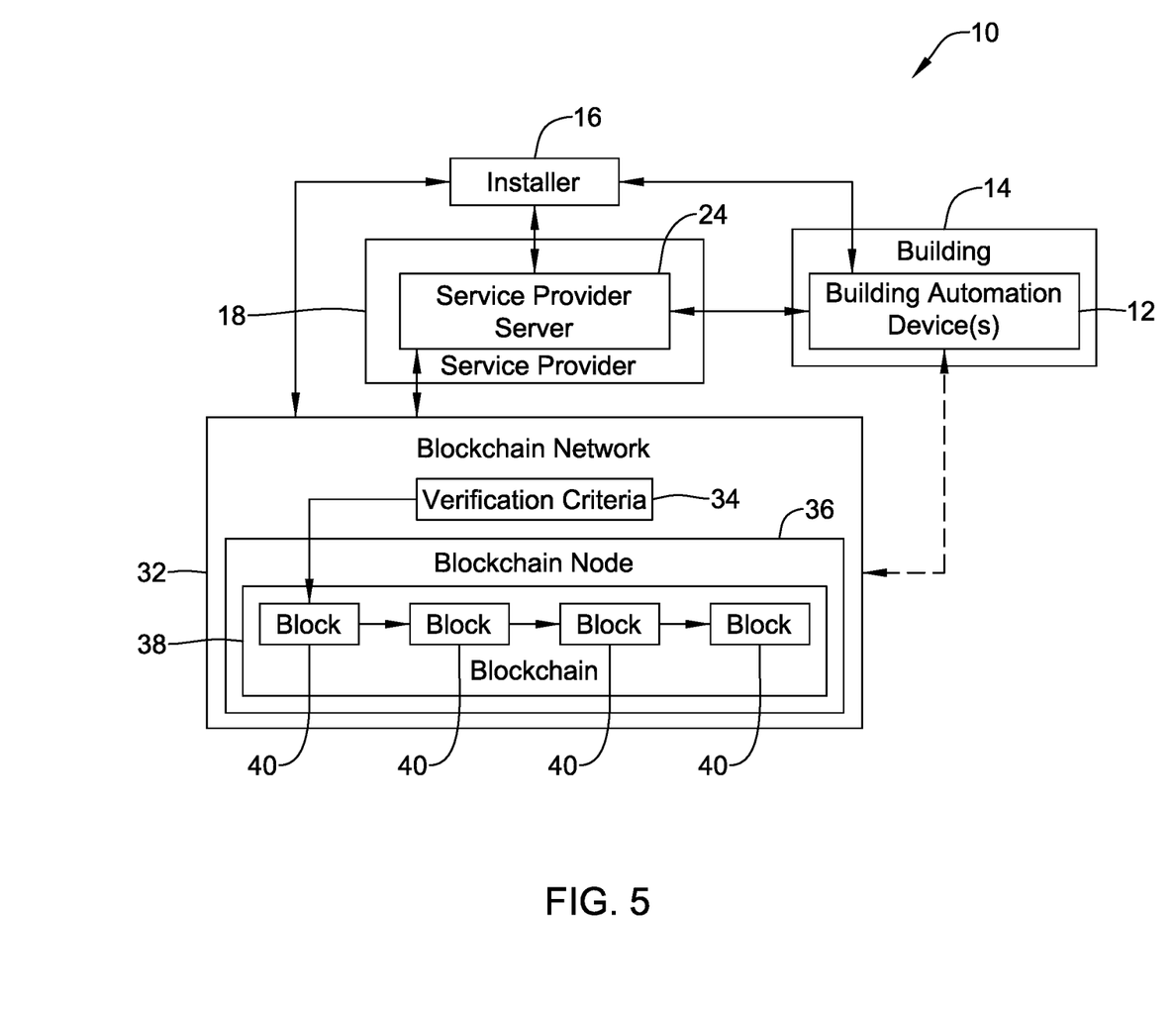
FIG. 5 is a schematic diagram of an illustrative system for installation of building automation devices.

FIG. 5 schematically depicts the illustrative system 10 where the system 10 may be configured for verifying proper installation of the IP connectable building automation device 12 by the installer 16. The system 10 configured for verifying proper installation of the IP connectable building automation device 12 may include, among other additional or alternative components, IP connectable building automation devices 12, one or more buildings 14, the service provider 18 including a service provider server 24 (e.g., a single server or multiple servers, such as a computing device server for interacting with the installer 16 and a server for interacting with installed IP connectable building automation devices 12, among other servers), the installer 16 (e.g., crowdsourced installer 22 or other suitable installer), and a blockchain network 32. The blockchain network 32 may be the blockchain network and its components (e.g., blockchain nodes, blockchain, blocks, etc.) discussed above with respect to FIG. 4, but this is not required in all instances. In one example, similar to the blockchain network discussed above, the blockchain network 32 may be made up of a plurality of blockchain nodes 36 and a blockchain 38 (e.g., a distributed ledger distributed to a plurality of the blockchain nodes 36) having one or more blocks 40. In some cases, the blockchain 38 may include verification criteria configured to allow the blockchain network 32 to at least partially verify proper or successful installation of the IP connectable building automation devices 12. The verification criteria 34 may be stored within a block 40 of the blockchain 38 and/or may be part of a smart contract formed via a virtual machine (e.g., Ethereum Virtual Maching (EVM) and/or other suitable virtual machine) and/or formed in one or more other suitable manners.

In operation, the illustrative system 10 depicted in FIG. 5 may facilitate creating trust between the installer 16 and the service provider 18 by utilizing the blockchain network 32 to verify installation quality of the IP connectable building automation devices 12, and then effect payment and/or penalties related to the installation quality of the IP connectable building automation devices 12. In the system 10 depicted in FIG. 5, the installer 16 and the service provider 18 may agree on criteria/terms for the installation of one or more IP connectable building automation devices 12 and/or the service provider 18 may otherwise establish criteria/terms for the installation of the one or more IP connectable building automation devices 12. The agreed upon criteria/terms may include the verification criteria 34, which may be a set of metrics that an installed building automation device must meet and if the metrics are met, the installer 16 may receive an agreed upon reward, and if the metrics are not met, a penalty may be assessed against the installer 16. The verification criteria may include, among other information, a name or identification of the installer 16, an identification (e.g., MAC address and/or other suitable identification information) of one or more building automation devices 12, IP connection quality metrics (e.g., a connectivity quality metric between the one or more building automation devices 12 and the service provider 18 (e.g., the server 24 of the service provider) (e.g., a count of a number of connectivity defects over a period of time, including but not limited to a count of connection hand-shake failures, data submission failures, a parity check error, an unexpected connection termination, etc.), installation quality metrics, operational errors, incorrect data coming from the identified IP connectable building automation device 12 (e.g., data values outside of an expected range, data values that are of an incorrect data type, etc.) and/or other suitable verification criteria. Once the criteria/terms are established, the service provider server 24 may communicate with the blockchain network 32 and document the verification criteria 34 into a block 40 of the blockchain 38.

Once the installer 16 has installed the building automation devices 12 at the building 14, which may include connecting the building automation devices 12 to a wide area network (WAN) (e.g., the Internet and/or other suitable WAN), the installed building automation devices 12 may be able to communicate with the service provider 18 via the service provider server 24 and/or with the blockchain network 32. The service provider 18 may be configured to send control instructions, send software updates, and/or send other suitable information to the building automation devices 12 via the service provider server 24 and/or receive connectivity data, operational data, and/or other suitable information from the building automation devices 12. In some cases, the blockchain network 32 may be configured to send control instructions, send software updates, and/or send other suitable information to the building automation devices 12 and/or receive connectivity data, operational data, and/or other suitable information from the building automation devices 12 and/or the service provider server 24. The line between the building automation device 12 and the blockchain network 32 in FIG. 5 is shown as a broken line to indicate that, in some cases, a direct connection (e.g., a connection without intermediaries such as the service provider 18 and/or other intermediaries) between the building automation devices 12 and the blockchain network 32 may be omitted. The service provider 18, the building automation devices 12, and/or the blockchain network 32 may establish connections between one another via known addresses of the other devices that may be accessible over the WAN.

Figure 6:
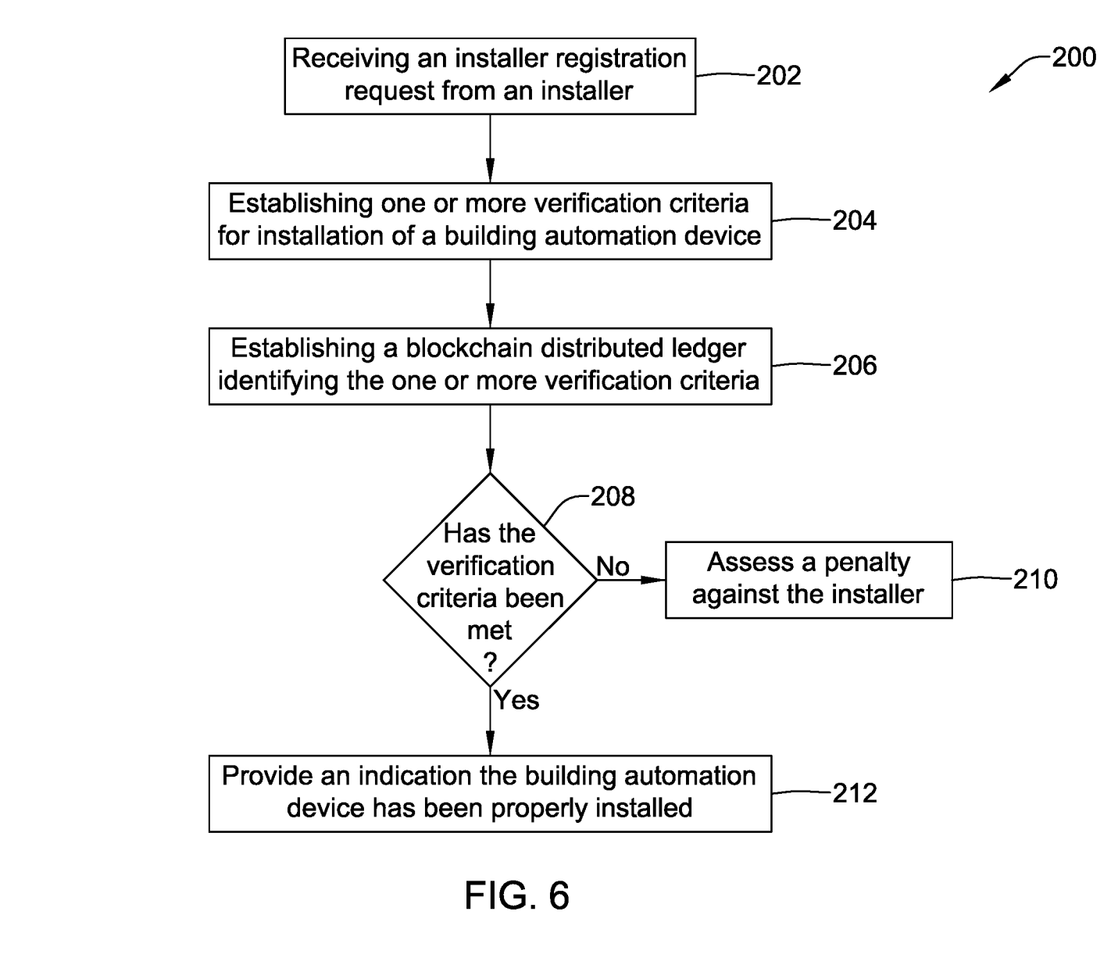
FIG. 6 is a schematic flow diagram of an illustrative method of verifying installation of building automation devices.

FIG. 6 depicts a schematic flow diagram of an illustrative method 200 of verifying installation of building automation devices (e.g., building automation devices 12 and/or other suitable building automation devices). In some cases, the building automation devices may be IP connectable building automation devices installed by an installer (e.g., the installer 16 and/or other suitable installer) at a remote site (e.g., the building 14 and/or other suitable remote site). The installer may be a crowdsourced installer (e.g., the crowdsourced installer 22 and/or other suitable crowdsourced installer).

The method 200 may include receiving 202 an installer registration request (e.g., an installer registration) from an installer. In some cases, the installer registration request may be received at a service provider (e.g., the service provider 18 and/or other suitable service provider) and/or at an intermediary between the installer and the service provider. The installer registration request may be received over a WAN (e.g., the Internet and/or other suitable WAN). In some cases, the installer registration may be received via a website provided by a service provider server (e.g., the service provider server 24 and/or other suitable service provider server) or other suitable computing device (e.g., the computing device 50 and/or other suitable computing device) in communication with service provider.

The registration request may include information concerning the installer, the one or more jobs or parts of jobs in which the installer is interested, and/or other suitable information concerning the installer and/or one or more jobs offered by the service provider. In one example, the registration request may provide identifying information for the installer and one or more building automation devices that are to be installed and connected to the service provider over the WAN by the installer. Identifying information for the installer may include, but is not limited to, an installer name, an installer company, an installer date of birth, an installer social security number, a picture of the installer, experience of the installer, an address for the installer, financial account information for the installer for deposit of funds, and/or other suitable information related to the installer. Identifying information for the one or more building automation devices may include, but is not limited to, a device type of the building automation device, a MAC address for the building automation device, and/or other suitable information related to the building automation device.

In response to receiving 202 the installer registration request from the installer and/or in conjunction with receiving 202 the installer registration request, the method 200 may include establishing 204 one or more verification criteria (e.g., the verification criteria 34 and/or other suitable verification criteria) for installation of the building automation device. In some cases, the verification criteria may be established through a negotiations between the service provider and the installer. Alternatively or in addition, the verification criteria may be established by the service provider based on one or more factors. Example factors on which verification criteria may be based include, but are not limited to, a type of building automation device to be installed, an amount of building automation devices to be installed, a location of a building in which the building automation device is to be installed, a type of the building in which the building automation device is to be installed, WAN access at the building in which the building automation device is to be installed, and/or other suitable factors.

Similar to as discussed above with respect to the verification criteria 34, the one or more verification criteria established 204 may be and/or may include a set of metrics that an installed building automation device must meet and if the metrics are met, the installer may receive (e.g., automatically receive and/or otherwise receive) an agreed upon reward and if the metrics are not met, an agreed upon penalty may be assessed (e.g., automatically assessed and/or otherwise assessed) by the service provider against the installer. The verification criteria may include, among other information, a name or identification of the installer, an identification (e.g., MAC address and/or other suitable identification information) of one or more building automation devices to be installed, IP connection quality metrics (e.g., a connectivity quality metric between the one or more building automation devices and the service provider (e.g., the server 24 of the service provider) (e.g., a count of a number of connectivity defects including, but not limited, a count of connection hand-shake failures, data submission failures, a parity check error, an unexpected connection termination, etc.), installation quality metrics, operational errors, incorrect data coming from the identified building automation device (e.g., data values outside of an expected range, data values that are of an incorrect data type, etc.) and/or other suitable verification criteria.

Further, the method 200 may include establishing 206 a blockchain distributed ledger identifying the one or more verification criteria that was established for the one or more building automation devices to be installed in the building. In some cases, the established distributed ledger may include establishing a block (e.g., the block 40 and/or other suitable blocks) in a blockchain (e.g., the blockchain 38 and/or other suitable blockchain) of a blockchain network (e.g., the blockchain network 32 and/or other suitable blockchain network) that may include the one or more verification criteria and that may identify the one or more building automation devices to be installed in the building.

In some cases, establishing the blockchain distributed ledger may include creating a smart contract in a block of the blockchain. The smart contract may be self-executing and once a determination as to whether the verification criteria has been met, the smart contract may cause the blockchain network to take action (e.g., take no action, display an action, assess a penalty, provide a reward, make a payment to the installer, etc.).

Once the blockchain distributed ledger identifying verification criteria and an associated building automation device has been established or created, a determination 208 as to whether the verification criteria has been met may be made. In some cases, the determination 208 may be made by the service provider and/or by the blockchain network comparing data received or not received from the installed building automation device and/or service provider server 24 to the verification criteria. In one example, the verification criteria may include one or more threshold values and the data received or not received from the installed building automation device and/or one or more values of parameters related to such may be compared to the one or more thresholds to determine whether the verification criteria has been met. One benefit of having the blockchain network determine whether the verification criteria has been met may be that the blockchain network may be configured to determine whether the verification criteria has been met based on data sent directly from the installed building automation device and/or service provider server 24 to the blockchain network, which may create trust in the relationship between the service provider and the installer.

The determination 208 may occur at any suitable time. In some cases, the determination 208 may occur after one or more predetermined time periods. In one example, the installer may be given a first predetermined time period to install the one or more building automation devices and connect those devices to the WAN after which the determination 208 or a portion of the determination 208 may be made, and after a second predetermined time period a further determination 208 may be made (e.g., to ensure the installed one or more building automation devices are continuing to operate correctly and stay connected to the WAN over time). However, other examples are contemplated including those that include zero, one, or more than two predetermined time periods. In addition to or as an alternative to using a predetermined time period to determine when to perform the determination 208, other factors may be utilized to determine when to perform the determination including, but not limited to, in response to a request by the service provider, in response to a request by the installer, after an established or predetermined amount of data is received from the installed building automation device, and/or other suitable factors.

Once the determination 208 has been made, one or more indications may be provided to the installer of the building automation device and/or the service provider (e.g., if the blockchain network is making the determination 208). When it has been determined that the verification criteria has not been met and the building automation device has not been properly installed, a penalty may be assessed 210 against the installer. When it has been determined that the verification criteria has been met and the building automation device has been properly installed, an indication may be provided 212 to the installer indicating the building automation device has been properly installed.

The penalty may be assessed to the installer in any suitable manner and/or may take on any suitable form. For example, the penalty assessed to the installer may be automatically assessed by the blockchain network and/or service provider in response to a determination that the building automation device was not properly installed (e.g., the verification criteria has not been met). In some cases, the penalty may be applied on a penalty scale, where the penalty may be more severe for repeated building automation device installation failures by the installer, less severe for installers that have not had failed building automation device installations or have a record of successful building automation device installations, a severity of the penalty may be determined based on the type of failed installation (e.g., WAN connection type failures versus operational type failures), and/or penalty severity may be based on one or more other suitable factors.

The assessed penalty may be any suitable type of penalty. The assessed penalties may include, but are not limited to, a financial penalty that is automatically withdrawn from the installer's bank account, a financial penalty that is automatically invoiced to the installer, a negative change in rating of the installer, etc.

The indication provided that the building automation device was properly installed may be provided to the installer in any suitable manner and/or may take on any suitable form. For example, the indication to the installer be automatically provided by the blockchain network and/or service provider in response to a determination that the building automation device was properly installed (e.g., the verification criteria or a portion thereof has been met). In some cases, the indication may be applied on a scale, where the indication is more positive for repeated building automation device installation successes by the installer, less positive for installers that have had failed building automation device installations or have a record of one or more failed building automation device installations, a level of positive feedback may be determined based on a type of the building automation device successfully installed, and/or a level of the positive indication may be based on one or more other suitable factors.

The provided indication may be any suitable type of indication. The provided indications may include, but are not limited to, a financial reward that is automatically added to the installer's bank account, a financial benefit that is automatically credited to the installer, a positive change in rating of the installer, etc.

Figure 7:
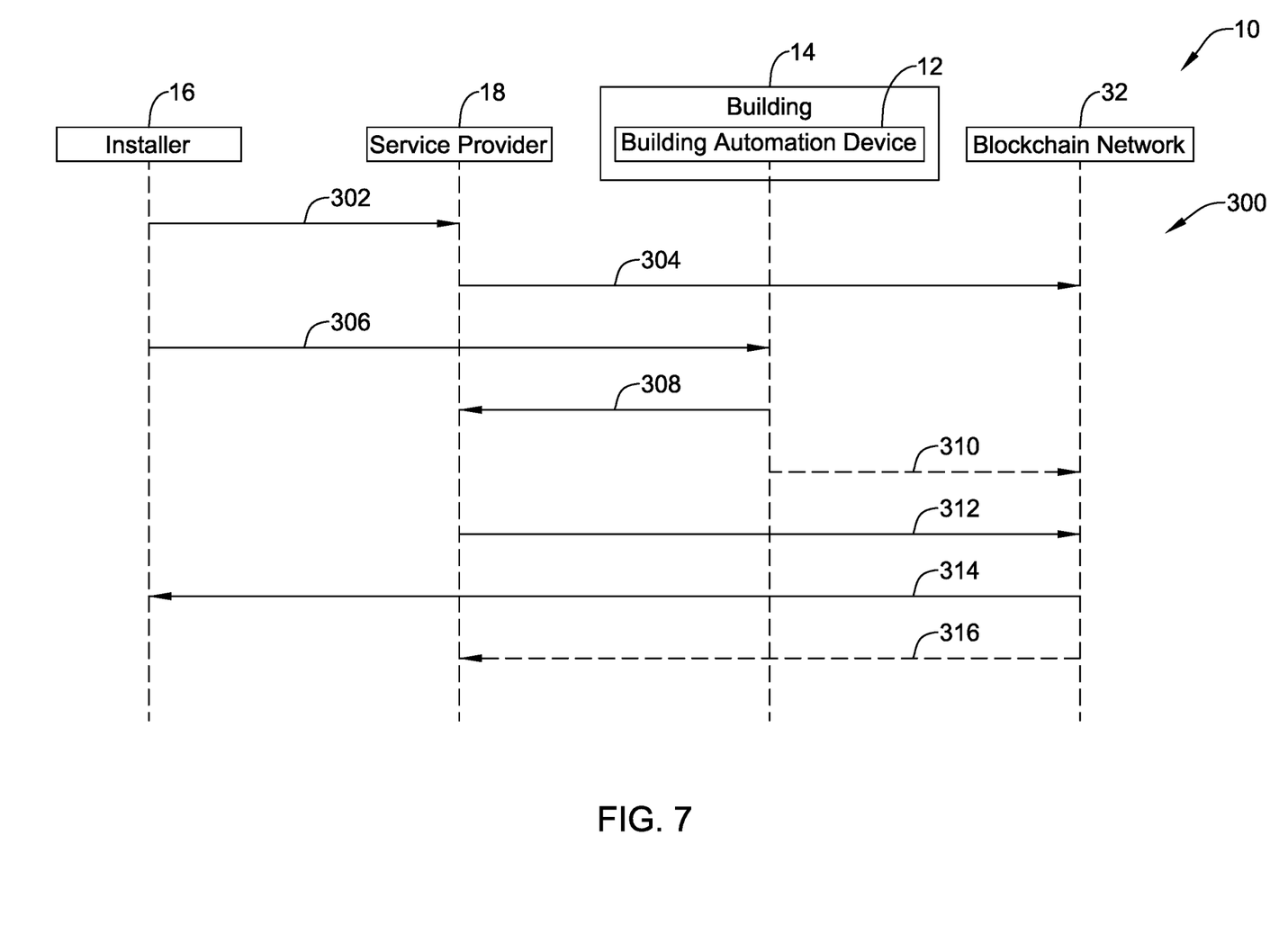
FIG. 7 is a schematic diagram of an illustrative process flow for verifying installation of building automation devices.

FIG. 7 a schematic diagram of an illustrative process flow 300 for verifying installation of building automation devices 12 with the system 10. In some cases, the process flow 30 may be similar to the method 200 described above with respect to FIG. 6, but this is not required. As discussed above, the system 10 may include one or more of the installer 16 (e.g., a crowdsourced installer 22 and/or other suitable installer), the service provider 18, the building automation device 12, and the blockchain network 32.

The process flow 300 may be initiated by the installer 16 providing 302 an installer registration request to the service provider 18. The installer request may include, among other information, a name of the installer, financial account information for the installer (e.g., an Internet based financial wallet, a bank account and routing number, etc.), identification information for the one or more building automation devices installed or to be installed (e.g., a MAC address and/or other suitable identification for the building automation device), one or more building names where the one or more building automation devices are installed or are to be installed, one or more building locations where the one or more building automation devices are installed or are to be installed, and/or other suitable information.

Although the process flow 300 of FIG. 7 depicts the providing 302 of the registration request as the first step, one or more other steps may be performed prior to providing 302 the registration request. Such other steps include, but are not limited to, an installer selecting one or more jobs or parts of one or more jobs that involve installing one or more building automation devices 12, installing the one or more building automation devices 12, and/or one or more other suitable steps.

In response to receiving the registration request, the process flow 300 may include the service provider 18 (e.g., via one or more service provider servers 24) deploying 304 verifying instructions and/or criteria to the blockchain network 32 by implementing a smart contract in the blockchain network 32 and/or implementing via one or more other suitable mechanisms. Similar to as discussed above, the verifying instructions and/or criteria may be saved to a block of the blockchain network 32. In some cases, the verification instructions and/or criteria may include, among other information, the name of the installer, the financial account information for the installer, the identification information for the one or more building automation devices installed or to be installed, one or more quality goals and/or metrics for the installation of the one or more building automation devices (e.g., IP connection quality metrics (e.g., a count of a number of connectivity defects including, but not limited to, a count of connection hand-shake failures, data submission failures, a parity check error, an unexpected connection termination, etc.), installation quality metrics, operational errors, incorrect data coming from the identified IP connectable building automation device 12), predetermined rewards and/or penalties to be implemented based on whether the quality goals and/or metrics for the installation of the one or more building automation devices are met, one or more time limits and/or a predetermined times by which the quality and/or metrics need to be met, and/or other suitable information.

Although not depicted in the process flow 300, once the verifying instructions and/or criteria has been deployed 304 to the blockchain network 32, the service provider 18 may provide an indication to the installer 16 that the installer registration request was accepted and that an agreement is in place. In some cases, the indication that the installer registration request is in place may provide the quality goals and/or metrics for installing the one or more building automation devices 12, the one or more time limits and/or predetermined times by which the quality and/or metrics need to be met, the set rewards and/penalties to be implemented based on whether the quality goals and/or metrics are met, and/or other suitable information.

Once the installer registration request has been accepted and/or at one or more other times, the installer 16 may install 306 the one or more building automation devices 12 at the one or more buildings 14. Installation 306 of the one or more building automation devices 12 at the one or more building 14 may require the installer 16 to connect each of the one or more building automation devices 12 to an associated building automation system and/or network of the building 14 (e.g., when the building automation device is a thermostat, the thermostat may need to be properly connected to the associated heating, ventilation, and air conditioning (HVAC) system based on a particular set up and/or configuration of the HVAC system) and connect each of the one or more building automation devices 12 to a WAN (e.g., which may be through a building specific LAN and/or other suitable network connections).

Once the one or more building automation devices 12 are connected to a WAN and/or are at least partially setup properly, the service provider 18 and/or the blockchain network 32 may be connected to the one or more building automation devices 12. Once there is a connection between the one or more building automation devices 12 and one or both of the service provider 18 and the blockchain network 32, the one or more building automation devices 12 may transit 308 operational and/or connectivity data and/or other suitable information back to the service provider 18 (e.g., to the one or more servers 24 of the service provider 18). Additionally or alternatively, the one or more building automation devices 12 may transmit 310 to the blockchain network 32 the same or different operational and/or connectivity data and/or other suitable information as is transmitted 308 to the service provider 18. Example operational and/or connectivity data and/or other suitable information transmitted from the one or more building automation devices may include, but is not limited to, IP connection data between the one or more building automation devices 12 and the service provider 18 (e.g., the server 24 of the service provider)), operational error data, incorrect data coming from the identified IP connectable building automation device 12 (e.g., data values outside of an expected range, data values that are of an incorrect data type, etc.) and/or other suitable data and/or information.

In some cases, both of the service provider 18 and the blockchain network 32 may receive the data and/or information from the one or more building automation devices 12. Such a configuration may support trust between the installer 16 and the service provider 18 as the duplicate information may be utilized to ensure the data from the one or more building automation devices 12 is accurate and is not manipulated by the service provider 18 to its gain.

Once the service provider 18 has received or is receiving the operational and/or connectivity data and/or information from the building automation device 12, the service provider 18 (e.g., via the one or more service provider servers 24) may log 312 the received operational and/or connectivity data and/or information with the blockchain network 32. Similarly, once, and if, the blockchain network 32 receives the operational and/or connectivity data and/or information from the building automation device 12, the blockchain network 32 may log the received operational and/or connectivity data and/or information.

The received operational and/or connectivity data and/or information may be logged in any suitable manner. In one example, the operational and/or connectivity data and/or information may be logged or otherwise saved in a database within or associated with the blockchain network 32 and a record of the logged or otherwise saved operational and/or connectivity data and/or information may be provided into a block (e.g., the block 40 and/or other suitable block for a blockchain) and the block may be added to blockchain (e.g., the blockchain 38 and/or other suitable blockchain). Further, in response to receiving the operational and/or connectivity data and/or information and based on the verification instructions and/or criteria provided by the service provider 18, the blockchain network 32 may update whether the operational and/or connectivity criteria have been met. The process of logging and/or otherwise saving the operational and/or connectivity data and/or information in a database and updating whether the operation and/or connectivity criteria have been met may be repeated as operational and/or connectivity data and/or information is received at the blockchain network based on the verification instructions and/or criteria until the time limit or predetermined time period(s) have been reached or otherwise expired.

If the blockchain network 32 determines the verification criteria has been met within or at the end of the time limit and/or predetermined time or determines one or more portions of the verification criteria have not been met at the end of the time limit and/or predetermined time based on the received operational and/or connectivity data and/or information (e.g., by comparing the data received or not received to the one or more thresholds of the verification criteria and/or determining in one or more other suitable manner), the blockchain network 32 may be configured to provide 314 an indication to the installer 16 and/or, optionally, provide 316 an indication to the service provider 18 that the verification criteria has been met or one or more parts of the verification criteria have not been met. When the service provider 18 receives the indication that the verification criteria has been met or one or more parts of the verification criteria have not been met, the service provider 18 may then provide a similar or different indication to the installer 16, but this is not required and the installer 16 may receive the indication directly from the blockchain network 32 and/or other suitable intermediary.

The indication provided 314, 316 to the installer 16 and/or the service provider 18 may be in the form of a reward if one or more of the verification criteria were met and a penalty if one or more of the verification criteria were not. The provided reward may be any suitable type of reward. The provided rewards may include, but are not limited to, a financial reward that is automatically added to the financial account of the installer 16, a financial benefit that is automatically credited to the installer 16, a positive change in rating of the installer 16, etc. The assessed penalty may be any suitable type of penalty. The assessed penalties may include, but are not limited to, a financial penalty that is automatically withdrawn from the financial account of the installer 16, a financial penalty that is automatically invoiced to the installer 16, a negative change in rating of the installer 16, etc.

Although not necessarily shown in the process flow 300, the service provider 18 (e.g., via the one or more service provider servers 24) may receive the operational and/or connectivity data and/or information from the building automation device 12 and determine one or more parameters (IP connection quality parameters (e.g., a connectivity quality parameters between the one or more building automation devices and the service provider (e.g., a count of a number of connectivity defects)), installation quality parameters, operational error parameters, incorrect data coming from the identified building automation device parameters (e.g., parameters related to data values with respect to an expected range, data values with respect to an expected data type, etc.)) based on the operational and/or connectivity data and/or information received. In some cases, the parameter(s) determined may be related to whether the building automation device 12 has been properly installed and/or properly connected to the service provider 18 over the Internet by the installer 16. In such cases, although not required in all instances, the service provider 18 may provide the parameter(s) and/or values of the parameters determined to the blockchain network 32 (e.g., the blockchain of the blockchain network 32). In such cases, blockchain of the blockchain network 32 may be configured to analyze the parameter(s) received to determine whether the building automation device 12 has been properly installed and connected to the service provider 18 over the Internet by the installer. Such a flow may allow raw data to be sent from the building automation device 12 to the service provider 18, where the service provider 18 may analyze the data received from the building automation device 12 and develop meaningful parameters values (e.g., a count of errors, etc.) for the blockchain to analyze (e.g., to compare to the verification criteria). Then, in view of the analysis of the parameters received by the blockchain, the blockchain may initiate an indication to the installer 16 and/or the service provider 18 based on the analysis. Similar to as discussed above, a reward may be provided when the blockchain determines the building automation device 12 has been properly installed and/or connected to the service provider 18 over the internet by the installer 16 and a penalty may be provided when the blockchain determines the building automation device 12 has not been properly installed and/or connected to the service provider 18 over the internet by the installer 16.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for verifying an installation of an Internet Protocol (IP) connectable building automation device, the method comprising:

creating a self-executing smart contract associated with a blockchain distributed ledger, where the smart contract identifies the identified Internet Protocol (IP) connectable building automation device, one or more verification criteria for establishing that the Internet Protocol (IP) connectable building automation device has been properly installed, and an installer assigned to install the identified Internet Protocol (IP) connectable building automation device;

a service provider server receiving data from the identified Internet Protocol (IP) connectable building automation device over the Internet after the identified Internet Protocol (IP) connectable building automation device has been installed and connected to the service provider server over the Internet by the installer;

the service provider server determining one or more parameters based on the received data that relate to whether the identified Internet Protocol (IP) connectable building automation device has been properly installed and connected to the service provider server over the Internet by the installer;

the service provider server providing one or more of the parameters to the blockchain distributed ledger, wherein upon receiving the one or more of the parameters, the smart contract of the blockchain distributed ledger is configured to self-execute to:

automatically compare one or more of the parameters to one or more of the verification criteria to determine whether the identified Internet Protocol (IP) connectable building automation device has been properly installed and connected to the service provider server over the Internet by the installer, and update the blockchain distributed ledger with a result; and automatically provide an indication to the installer when the smart contract of the blockchain distributed ledger has determined that the identified Internet Protocol (IP) connectable building automation device has been properly installed and connected to the service provider server over the Internet by the installer.

2. The method of claim 1, wherein the smart contract of the blockchain distributed ledger is further configured to assess a penalty against the installer when the smart contract of the blockchain distributed ledger determines that the identified Internet Protocol (IP) connectable building automation device has not been properly installed and connected to the service provider server over the Internet.

3. The method of claim 1, wherein the one or more parameters determined by the service provider server include a parameter representative of a connectivity quality between the identified Internet Protocol (IP) connectable building automation device and the service provider server.

4. The method of claim 3, wherein the connectivity quality comprises a count of a number of connectivity defects between the identified Internet Protocol (IP) connectable building automation device and the service provider server over a period of time.

5. The method of claim 4, wherein the number of connectivity defects include one or more of a connection hand-shake failure, a data submission failure, a parity check error, and an unexpected connection termination.

6. The method of claim 4, wherein the smart contract of the blockchain distributed ledger is configured to determine that the identified Internet Protocol (IP) connectable building automation device has not been properly installed and connected to the service provider server over the Internet by the installer when the count of the number of connectivity defects over the period of time exceeds a threshold value.

7. The method of claim 1, wherein the one or more parameters determined by the service provider server include a parameter representative of incorrect data coming from the identified Internet Protocol (IP) connectable building automation device.

8. The method of claim 7, wherein the parameter representative of incorrect data comprises data values that are out of an expected range.

9. The method of claim 7, wherein the parameter representative of incorrect data comprises data values that are of an incorrect data type.

10. A method of verifying installation of an Internet Protocol (IP) connectable building automation device at a remote site, the method comprising:
  storing a self-executing smart contract associated with a blockchain distributed ledger, where the smart contract identifies the identified Internet Protocol (IP) connectable building automation device and one or more verification criteria for establishing that the Internet Protocol (IP) connectable building automation device has been properly installed;
  receiving data, at a service provider server, from the identified Internet Protocol (IP) connectable building automation device over the Internet after the identified Internet Protocol (IP) connectable building automation device has been installed and connected to the service provider server over the Internet by an installer;
  determining one or more parameters based on the received data that relate to whether the identified Internet Protocol (IP) connectable building automation device has been properly installed and connected to the service provider server over the internet by the installer; and
  providing one or more of the parameters to the blockchain distributed ledger, wherein the smart contract of the blockchain distributed ledger self-executes to:
    automatically identify whether the one or more verification criteria have been satisfied based at least in part on one or more of the parameters, and when the one or more verification criteria have been satisfied, provide an indication to the installer that the Internet Protocol (IP) connectable building automation device has been properly installed.

11. The method of claim 10, wherein the smart contract of the blockchain distributed ledger is configured to automatically initiate a payment to the installer when the smart contract has determined that the Internet Protocol (IP) connectable building automation device has been properly installed by the installer.

12. The method of claim 11, wherein the smart contract of the blockchain distributed ledger is configured to assess a penalty against the installer when the smart contract has determined that the Internet Protocol (IP) connectable building automation device has not been properly installed by the installer.

13. The method of claim 12, further comprising:
  connecting to the Internet Protocol (IP) connectable building automation device after the installer has installed the Internet Protocol (IP) connectable building automation device;
  identifying one or more operational errors associated with the installed Internet Protocol (IP) connectable building automation device;
  logging one or more of the operational errors to the blockchain distributed ledger; and
  wherein one or more of the verification criteria are related to one or more of the operational errors.

14. A system for verifying installation of an Internet Protocol (IP) connectable building automation device at a remote site, the system comprising:
  a service provider server initiating a self-executing smart contract associated with a blockchain distributed ledger on the Internet for the installation of the identified Internet Protocol (IP) connectable building automation device, wherein the smart contract identifies the identified Internet Protocol (IP) connectable building automation device and one or more verification criteria for establishing that the Internet Protocol (IP) connectable building automation device has been properly installed;
  the service provider server receiving information from the identified Internet Protocol (IP) connectable building automation device over the Internet after the identified Internet Protocol (IP) connectable building automation device has been installed and connected to the service provider server over the Internet by an installer;
  the service provider server determining one or more parameters based on the received information that relate to whether the identified Internet Protocol (IP) connectable building automation device has been properly installed and connected to the service provider server over the Internet by the installer;
  the service provider server providing the one or more of the parameters to the blockchain distributed ledger, wherein the smart contract of the blockchain distributed ledger is configured to self-execute to:
    automatically compare one or more of the parameters to one or more of the verification criteria to determine whether the identified Internet Protocol (IP) connectable building automation device has been properly installed and connected to the service provider server over the Internet by the installer, and update the blockchain distributed ledger; and
    automatically provide an indication to the installer that the Internet Protocol (IP) connectable building automation device has been properly installed by the installer when the smart contract of the blockchain distributed ledger determines that the identified Internet Protocol (IP) connectable building automation device has been properly installed and connected to the service provider server over the Internet by the installer.

15. The system of claim 14, wherein the indication to the installer initiates a payment to the installer.

16. The system of claim 15, wherein the smart contract of the blockchain distributed ledger is further configured to assess a penalty against the installer when the smart contract of the blockchain distributed ledger determines that the identified Internet Protocol (IP) connectable building automation device has not been properly installed and connected to the service provider server over the Internet.

17. The system of claim 14, wherein the one or more parameters determined by the service provider server include a parameter representative of a connectivity quality between the identified Internet Protocol (IP) connectable building automation device and the service provider server.

18. The system of claim 17, wherein the connectivity quality comprises a count of a number of connectivity defects between the identified Internet Protocol (IP) connectable building automation device and the service provider server over a period of time, wherein the number of connectivity defects include one or more of a connection hand-shake failure, a data submission failure, a parity check error, and an unexpected connection termination.

19. The system of claim 18, wherein the smart contract of the blockchain distributed ledger is configured to determine that the identified Internet Protocol (IP) connectable building automation device has not been properly installed and connected to the service provider over the Internet by the installer when the count of the number of connectivity defects over the period of time exceeds a threshold value.

20. The system of claim 14, wherein the service provider server is configured to:
- connect to the Internet Protocol (IP) connectable building automation device after the installer has installed the Internet Protocol (IP) connectable building automation device;
- identify one or more operational errors associated with the installed Internet Protocol (IP) connectable building automation device;
- log one or more of the operational errors to the blockchain distributed ledger; and
- wherein one or more of the verification criteria are related to one or more of the operational errors.

* * * * *